United States Patent
Proctor, Jr. et al.

(10) Patent No.: US 7,002,902 B2
(45) Date of Patent: Feb. 21, 2006

(54) METHOD AND SYSTEM FOR ECONOMICAL BEAM FORMING IN A RADIO COMMUNICATION SYSTEM

(75) Inventors: James A. Proctor, Jr., Indialantic, FL (US); Lawrence Wayne LaMont, Jr., Melbourne, FL (US); George Rodney Nelson, Jr., Merritt Island, FL (US); Antoine J. Rouphael, Escondido, CA (US); John E. Hoffmann, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 834 days.

(21) Appl. No.: 09/791,503

(22) Filed: Feb. 23, 2001

(65) Prior Publication Data

US 2002/0009062 A1 Jan. 24, 2002

Related U.S. Application Data

(60) Provisional application No. 60/184,754, filed on Feb. 24, 2000.

(51) Int. Cl.
*H04J 11/00* (2006.01)
(52) U.S. Cl. .................. 370/209; 370/335; 370/342; 370/479; 375/130; 375/147
(58) Field of Classification Search .............. 370/209, 370/335, 342, 441; 375/130, 144, 147, 148, 375/260, 267, 347; 455/132
See application file for complete search history.

(56) References Cited

U.S. PATENT DOCUMENTS

| 5,859,842 | A | * | 1/1999 | Scott | 370/342 |
|---|---|---|---|---|---|
| 5,930,305 | A | | 7/1999 | Leib | |
| 6,064,338 | A | * | 5/2000 | Kobayakawa et al. | 342/378 |
| 6,122,260 | A | * | 9/2000 | Liu et al. | 370/280 |
| 6,339,703 | B1 | * | 1/2002 | Otsuka | 455/276.1 |
| 6,356,555 | B1 | * | 3/2002 | Rakib et al. | 370/441 |
| 6,473,447 | B1 | * | 10/2002 | Strich et al. | 375/130 |
| 6,584,302 | B1 | * | 6/2003 | Hottinen et al. | 455/69 |

FOREIGN PATENT DOCUMENTS

DE 19741872 C1 2/1999

* cited by examiner

*Primary Examiner*—Steven Nguyen
*Assistant Examiner*—Clemence Han
(74) *Attorney, Agent, or Firm*—Hamilton, Brook, Smith & Reynolds, P.C.

(57) ABSTRACT

Codes are applied to signals to reduce the number of transceivers and associated RF cabling extending from base electronics to antenna array electronics in a base station providing beam forming. The transceivers can be reduced to as few as one, and the RF cabling can be reduced to none. The codes may be orthogonal codes, such as Walsh codes. The codes are applied: to weights used to produce the beam forming, signal being transmitted or received, or both. The codes are applied a second time to decompose the coded weights/signal to associate the weights and signal with the beam forming. The coded weights/signal can be summed, including with other coded weights/signals, to produce a composite code division multiplexed signal for transmission between transceiver(s) and antenna array electronics over a single RF or non-RF cable spanning between the base electronics and array electronics. The complexity, size, and cost of electronics and cables are reduced, and calibration of transceivers and demodulators can be eliminated.

44 Claims, 15 Drawing Sheets

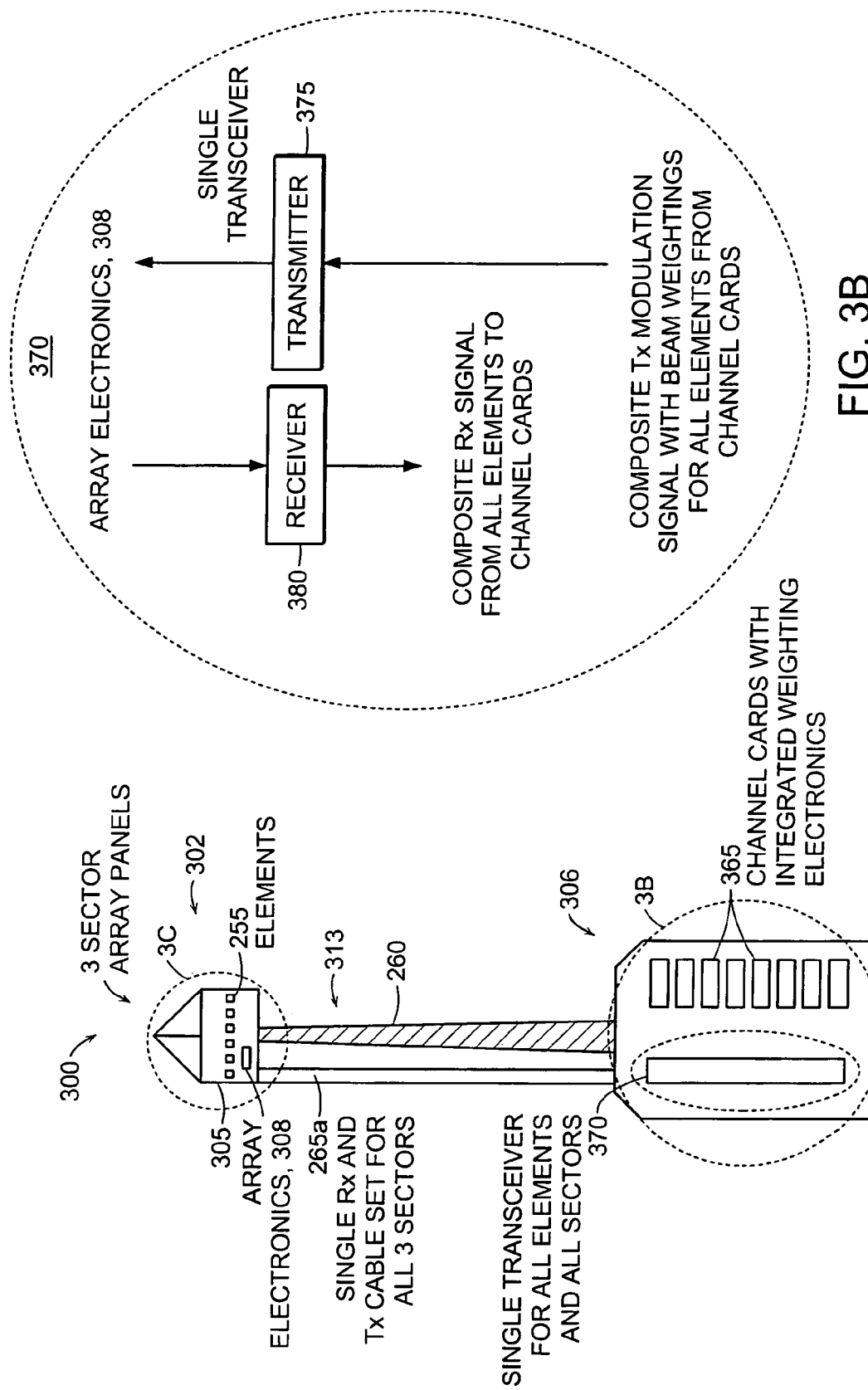

METHOD AND SYSTEM FOR ECONOMICAL BEAM FORMING IN A RADIO COMMUNICATION SYSTEM

RELATED APPLICATION

This application claims the benefit of U.S. Provisional Application No. 60/184,754, filed on Feb. 24, 2000, entitled "Method and System for Economical Beam Forming in a Radio Communication System," by Proctor, et al., the entire teachings of which are incorporated herein by reference.

BACKGROUND OF THE INVENTION

In wireless voice and data communications, it is desirable to maximize the number of users in a base transceiver station (BTS) sector while at the same time providing high signal quality (i.e., high SNR) for the users. One way to achieve both conditions is through the use of a beam forming antenna. A BTS can generate plural directed beams by employing an antenna array and digitizing signals transmitted to and received from the antenna array in a weighted manner (i.e., amplitude and/or phase) that produces the plural beams. Since the beams have high gain in the direction of the main lobe of the composite beam, high SNR is achieved. And, since the BTS can change the weights associated with each antenna element in the array to cause the beam to scan, a high gain can be maintained throughout the duration of a user's wireless connection with the base station.

FIG. 1 is a schematic diagram of a wireless communications network 100 having three base transceiver stations 105a, 105b, 105c.

The first BTS 105a provides three beams 107a, 107b, and 107c produced by beam forming. The first beam 107a is used for communicating to a first user 109a in the first BTS sector. The first user 109a is inside a building 108. Because the first beam 107a is produced through the use of beam forming, it has excess link margin to allow deeper penetration into the building 108 for communicating with the user 109a. Further, multi-path noise caused by a beam reflecting off other buildings is minimized or avoided due to the formed beam 107a.

The first BTS 105a produces a second beam 107b to communicate with a second user 109b in the first BTS sector. In this case, the second beam 107b is purposely kept short so as to reduce pilot pollution where BTS sectors intersect.

The first BTS 105a also produces a third beam 107c for communicating with a third user 109c in the first BTS sector. Similar to the first beam 107a, the third beam 107c reduces multipath noise effects due to its directiveness. Also, the third user 109c is closer to the third BTS 105c; but, because of the high gain produced by beam forming, the third beam 107c of the first BTS 105a is able to reach the third user 109c to assist the third BTS 105c, which is heavily loaded with other users, as will be discussed.

The antenna gain is proportional to 20LOG(number of elements) plus vertical gain. For example, for a sixteen element array four feet wide, the beam forming may provide over thirty-seven dB versus fifteen dB for conventional antennas.

The second BTS 105b provides two beams, 111a, 111b produced by beam forming. The first beam 111a communicates with a first user 113a in the second BTS sector. The second beam 111b provides a link to a second user 113b in the second BTS sector. Because of the high-link margin produced by beam forming, sparse initial deployment provides lower initial capital requirements for the wireless communications network 100.

The third BTS 105c is able to provide four beams 115a, 115b, 115c, 115d in a beam forming manner to communicate with high-gain to four users 11 7a, 117b, 117c, and 117d, respectively.

As can be seen from the beams 107, 111, 115 produced by the base transceiver stations 105, the use of beam forming eliminates noise problems caused by multipath, pilot signal pollution, and interference from signals from adjacent base transceiver stations. Further, the high gains afforded by the beams produced by the beam forming provides a so-called virtual point-to-point RF effect.

FIG. 2A is a block diagram of the prior art base transceiver station 105a. The base transceiver station 105a has an antenna assembly 205, base electronics 210, and base station tower 215. The base electronics 210 comprise transceivers 220, weighting electronics (e.g., Butler Matrix, FFT or other) 225, and user channel cards 230.

As shown in detail in FIG. 2B, the transceivers 220 each comprise a transmitter 235, receiver 240, and duplexer 245. The duplexer 245 is coupled to a single element 255 in a sector antenna array 250, as shown in FIG. 2C. The coupling between the transceivers 220 and the elements 255 of the sector antenna array 250 is made via parallel cables 265a, 265b, 265c, and so on The number of parallel cables used is equal to the number of transceiver/element pairs. Each cable is expensive, heavy, and sensitive to temperature changes. Similarly, the transceivers are expensive, relatively large in size, and sensitive to temperature and humidity changes.

Continuing to refer to FIG. 2A, extending upward from the base electronics 210 is an antenna assembly support pole 260, on which the sector antenna array(s) 250 is/are supported. Typically, antenna assembly support pole 260 is capable of supporting nine parallel cables 265. Because (i) it is useful to have three sector antenna arrays 250 for transmitting and receiving in 360° and (ii) each sector antenna array 250 preferably includes at least four elements 255, nine parallel cables 265 is limiting to the capacity of the base transceiver station 105a.

SUMMARY OF THE INVENTION

The problem with traditional beam forming systems is that the number of RF transceiver systems required in a base terminal station (BTS) adds complexity and cost to the system. RF transceivers, including cabling and other associated components, have performance characteristics that must be calibrated to match each other in order to make the beam forming operate properly. Since the RF transceiver, cabling, and other associated components tend to have gain and phase offset drift over time, temperature, and humidity, the traditional beam forming system must be supported by plural, expensive, calibration electronics to maintain performance.

Moreover, in traditional beam forming systems, the weight and size of RF cabling tends to be significant for single-pole structures that support the antenna arrays. Typical single-pole structures can handle nine RF cables. Since, in traditional beam forming systems, each element in an antenna array requires an individual RF cable spanning between the element/transceiver pairs, the number of elements in an array used for beam forming is restricted in number for single-pole structures.

Cost/benefit analysis shows that a maximum of four antenna elements are practical in traditional beam forming systems. Fewer antenna elements in an antenna array result in fewer users that can be supported by a beam forming system at any one time. Also, fewer antenna elements produce a broader beam than a higher number of antenna elements. The broader beam tends to be a restriction on overall system performance because it is a lower antenna gain than a narrower beam (i.e., 3 dB gain for one-half the beam width), among other reasons.

Addressing the problems of the prior art beam forming systems, the principles of the present invention apply digital multiplexing techniques to a beam forming system to reduce RF components and improve system performance. The reduction in RF components eliminates the need for RF channel-to-RF channel calibration and reduces weight, complexity, and cost. Reducing weight, complexity, and cost allows the number of elements in the antenna array to be increased. More antenna elements results in at least the following benefits: higher user capacity, higher SNR, more antenna beams, narrower antenna beams, higher in-building penetration, and lower cost components.

Accordingly, one aspect of the present invention is a method and system for receiving signals in a beam forming manner in a radio communication system. A signal is detected at a given element of plural elements forming an antenna array. A code corresponding to the given element is applied to the system at the given element to distinguish the signal from among plural signals received by the plural elements.

The coded signals from the plurality of elements are summed together to form a code division multiplexed signal. The system then produces a composite baseband signal corresponding to the code division multiplexed signal. In one embodiment, producing the composite baseband signal includes (i) controlling the gain, (ii) down-converting the code division multiplexed signal, and (iii) sampling the code division multiplexed signal, or a representation thereof.

The system may further extract the given signal from the given element. Extracting the given signal includes multiplying the composite baseband signal by the code applied to the given signal. The system then applies a weight to the extracted signal. Further, the system may (i) extract a subset of signals from the baseband signals, (ii) apply weights to the extracted signals, and (iii) sum the multiple weighted extracted signals to yield signals producing a spatial beam forming effect. This provides beam forming in a simple way.

To produce beam forming in an elegant way, the system (a) replicates the codes applied to the signals at the elements, (b) applies weights to the replicated codes, (c) sums the coded weights to form a composite signal, (d) multiplies the received baseband composite signal by the weighted composite signal, (e) forms a single composite signal, and (f) integrates the single composite signal over the duration of the code to yield a spatial beam forming effect.

Applying a code to the signal at the given element can be performed by modulating the code onto the RF signal. Then, the system samples a representation of the modulated RF signal, such as RF, baseband, or intermediate frequency (IF) representation, where the timing between the modulation and the sampling are locked to avoid sampling modulation-related transitions.

The codes applied to the signal may be orthogonal codes. In one embodiment, the orthogonal codes are Walsh codes.

The method and system just described may be deployed in a base station in the radio communication system.

Another aspect of the present invention is a method and system for transmitting RF signals using beam forming in a radio communication system. The system receives a data signal to be transmitted from, say, a data network. The system then generates weights modulated by codes, which correspond to respective antenna elements. The coded weights are modulated with the data signal being transmitted to produce a coded, weighted signal for beam forming.

The system may further modulate the coded weights with other data signals to be transmitted to produce respective, coded, weighted signals for beam forming. The coded, weighted signals can then be summed together to form a composite code division multiplexed signal. Further, the system converts the composite code division multiplexed signal to an analog representation, then up-converts the analog representation to an RF representation of the code division multiplexed signal.

Still referring to transmitting RF signals, proximal to the antenna array, at a subset of elements in the antenna array, the system decomposes the composite RF representation into respective RF representations comprising at least one weight and at least one data signal to be transmitted corresponding to the respective elements to form at least one beam having a pattern formed by the respective weights. The weights include amplitude information, phase information, or a combination thereof to produce the formed beam.

In transmitting, as in the case of receiving, the codes used by the system are typically orthogonal codes. In one embodiment, the orthogonal codes are Walsh codes.

The methods and systems just described for receiving and transmitting RF signals using beam forming in a radio communication system may be deployed in a base station.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a schematic diagram of a split electronics approach embodiment of a base transceiver station producing beam forming according to the principles of the present invention deployable in the wireless communication system of FIG. 1;

FIG. 3B is a schematic diagram of a transceiver used in the base transceiver station of FIG. 3A;

DETAILED DESCRIPTION OF THE INVENTION

Figure 1:
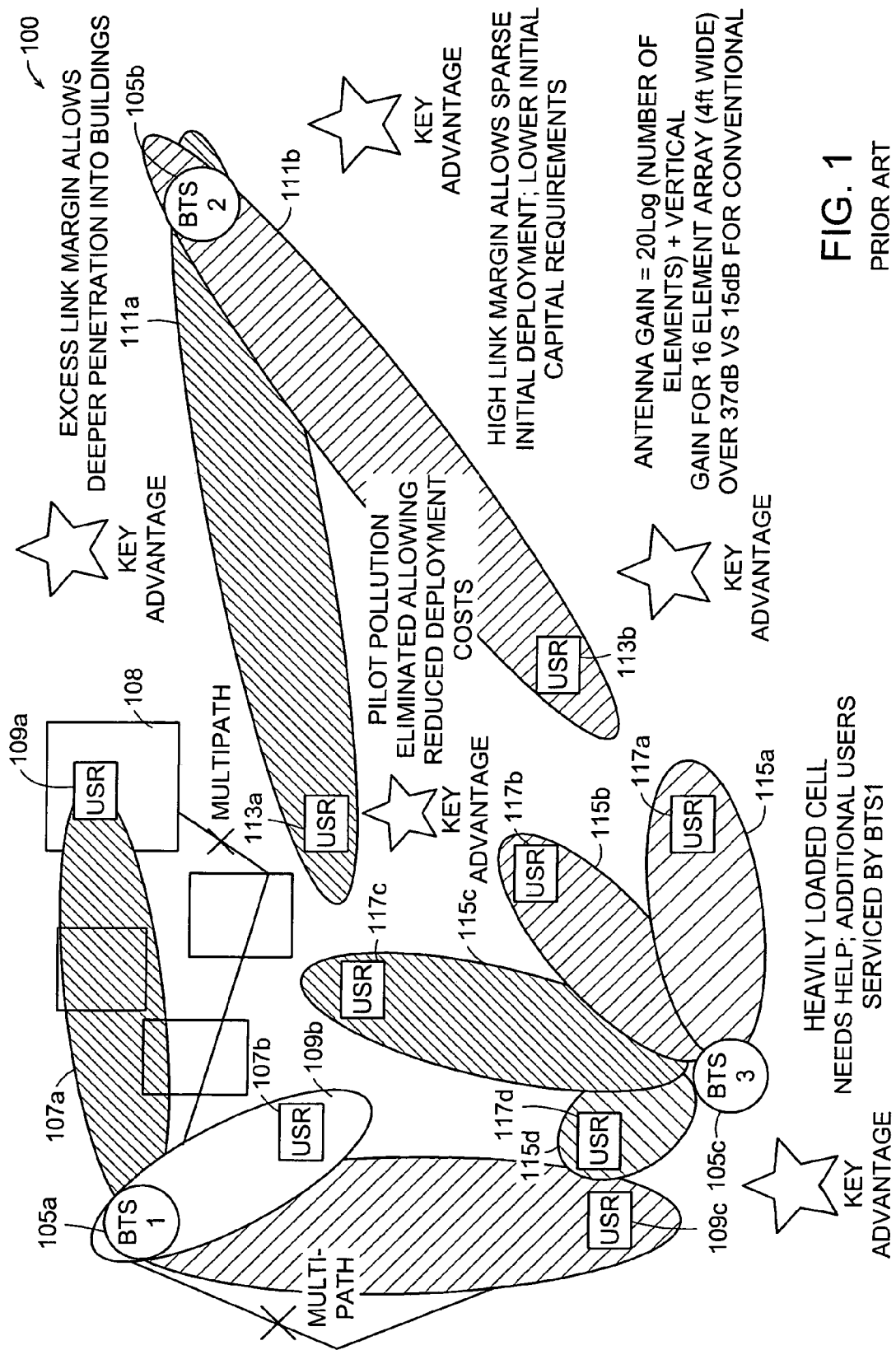
FIG. 1 is a schematic diagram of a prior art wireless communication system employing beam forming.

A description of preferred embodiments of the invention follows.

FIG. 3A is a block diagram of a base transceiver station 300 in which the principles of the present invention are employed. The base transceiver station 300 includes an antenna assembly 302, base electronics 306, and base station tower 313, on which the antenna assembly 302 is supported.

The antenna assembly 302, in this embodiment, includes three sector antenna arrays 305. The sector antenna arrays 305 include electronics, described later, and elements 255.

Figure 2C:
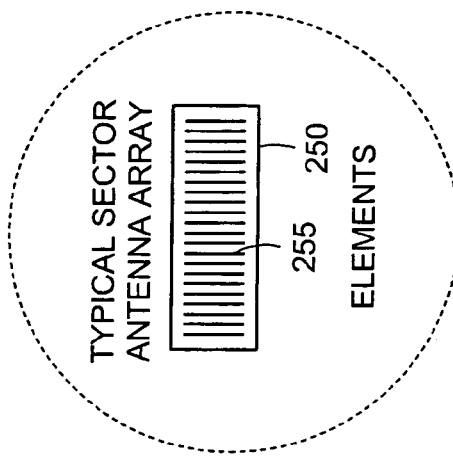
FIG. 2C is a schematic diagram of a sector antenna array of FIG. 2A.
Figure 2A:
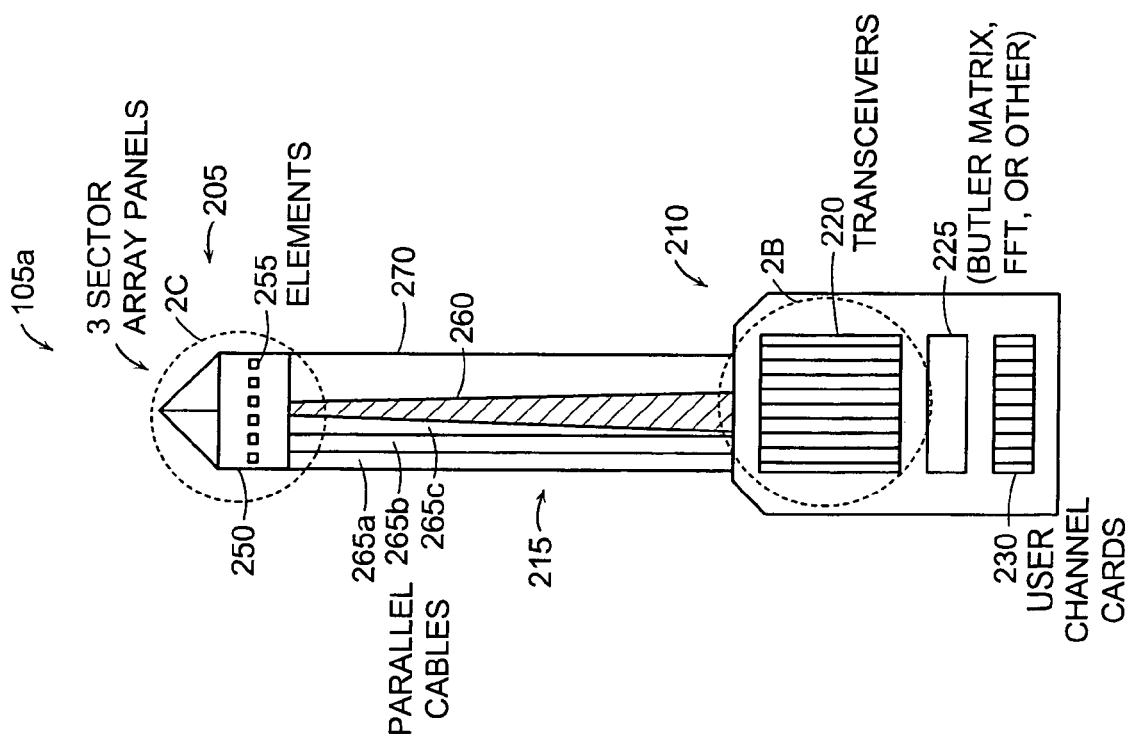
FIG. 2A is a schematic diagram of a prior art base transceiver station employed in the wireless communication system of FIG. 1.
Figure 2B:
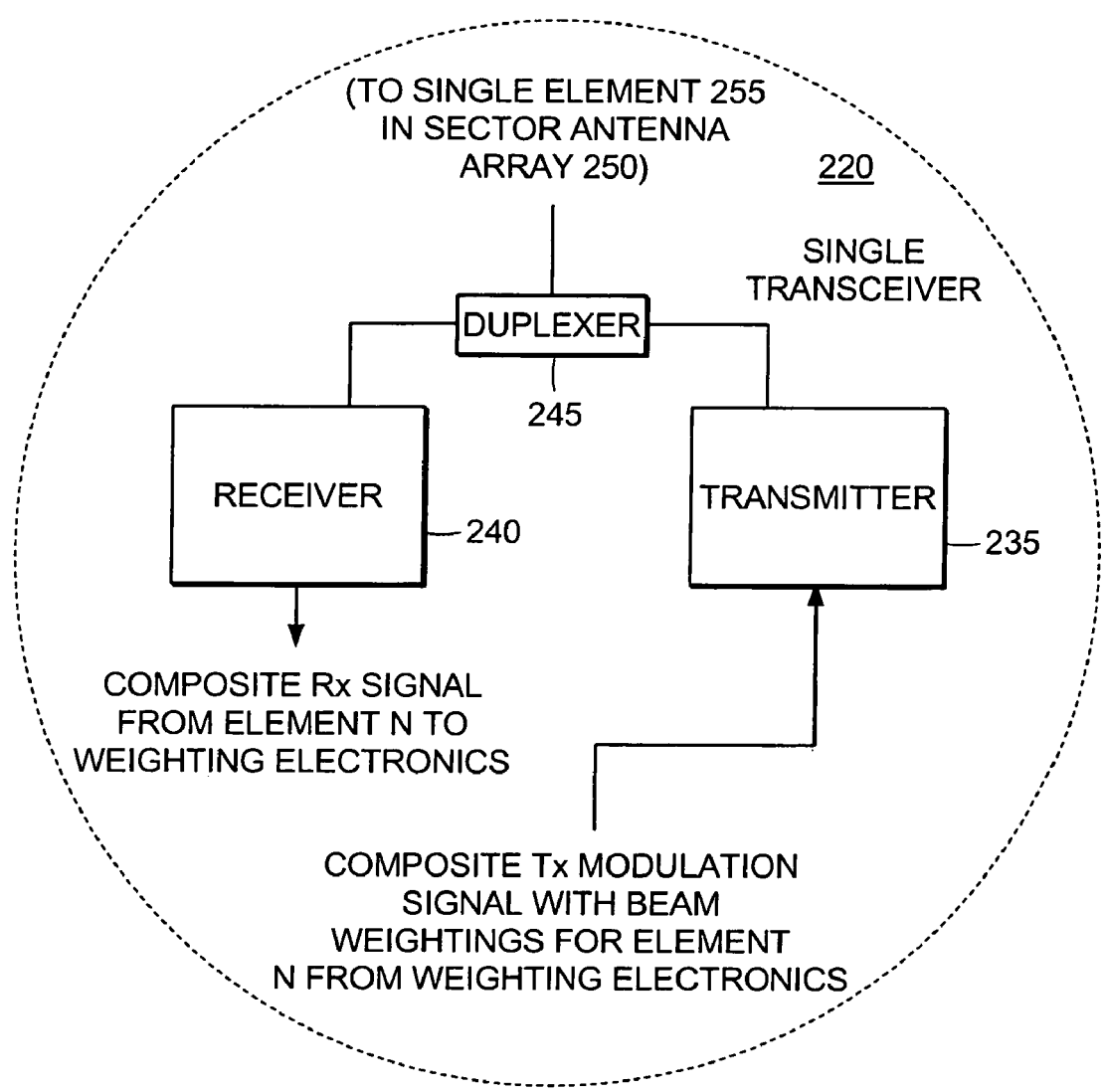
FIG. 2B is a schematic diagram of a transceiver used in the base transceiver station of FIG. 2A.

The base electronics 306 include a single transceiver 370 for all elements 205 of the sector antenna arrays 305. Further, the base electronics 306 include channel cards 365 with integrated weighting electronics, obviating separate weighting electronics 225 (FIG. 2A).

The base station tower 313 include only a single RF cable 265a in this embodiment. In other embodiments, the RF cable 265a is replaced with a fiber optic cable, wire cable, or optical or radio frequency wireless link.

The present invention simplifies the base transceiver station 300 using beam forming by using codes, such as orthogonal codes (e.g., Walsh codes), to code division multiplex the RF signals comprising data or information signals, where each code corresponds to a respective element 255 in the sector antenna array 305. Once coded, the RF signals can then be transmitted on a single path (e.g., RF cable 265a) or subset of paths being fewer in number than the number of elements 255 in the antenna array 305. It should also be understood that the same technique could be applied to data signals represented in intermediate-frequencies (IF) or baseband frequencies.

The use of code division multiplexing shifts the high cost, high-complexity hardware of the prior art to low-cost, low-complexity digital techniques. The digital techniques can be applied to both transmit and receive functions of the communication system. The present invention does not change the mathematics of beam forming, just how the mathematics of beam forming are applied.

The number of transceivers in the beam forming system can be reduced to as few as one transceiver for all elements 255 in the antenna array 305. For three-sector array panels or other arrangements, the present invention allows a single transceiver to be used to support all elements in all three sectors.

Since the number of RF cables, spanning between the RF transceiver(s) 370 and the antenna elements 255, is equal to the number of RF transceivers 370, the size and weight of the RF cabling is minimized by reducing the number of RF transceivers 370.

In an alternative embodiment, the transceiver(s) 370 is/are integrated into array electronics 308 that are deployed on the base station tower 313 with the elements 255 in the antenna array 305. A fiber optic cable, for instance, carries data to/from the transceiver deployed on the tower and the base electronics 306 at the base of the tower. In this case, both the base electronics 306 and transceiver 370 are equipped with fiber optic communication means well known in the art.

For receiving information signals (e.g. voice or data) having data to be transmitted, the code division multiplexing involves applying codes to the RF signal at the antenna elements 255 and summing the RF signals to form a composite (i.e., single) code division multiplexed signal. In individual baseband receiver modules, a weighted code generator generates code division multiplexed signals in which weights are coded with the same codes applied to the respective signals of the respective antenna elements. When the coded signals are modulated together, the signals and beam forming weights are extracted and multiplied as a result of the common codes, in a typical code division multiplexing manner.

The code generators can be time-locked to ensure signal integrity. Further, A/D sampling of the RF signal can be synchronized to ensure sampling does not occur during modulation transitions, resulting in a high-quality modulator. In this way, perfect demodulation can be achieved with inexpensive electronic components.

For transmitting the information signals, the receiving process is basically reversed. It should be noted that in conventional, non-beam forming systems, a single, transmitter power amplifier is used to increase the power of the transmitting RF signal. However, in the beam forming design, smaller, less-powerful transmitter power amplifiers are capable of being used, saving an order of magnitude in cost over a traditional transmitter amplifier.

Referring to FIG. 3B, the single transceiver 370 includes a transmitter 375 and a receiver 380. The transmitter 375 transmits a composite Tx modulation signal, with beam weights for all elements 255, from channel cards 365 to the array electronics 308. Similarly, the receiver 380 receives a composite Rx signal from the array electronics 308 being sent to the channel cards 365.

Figure 3C:
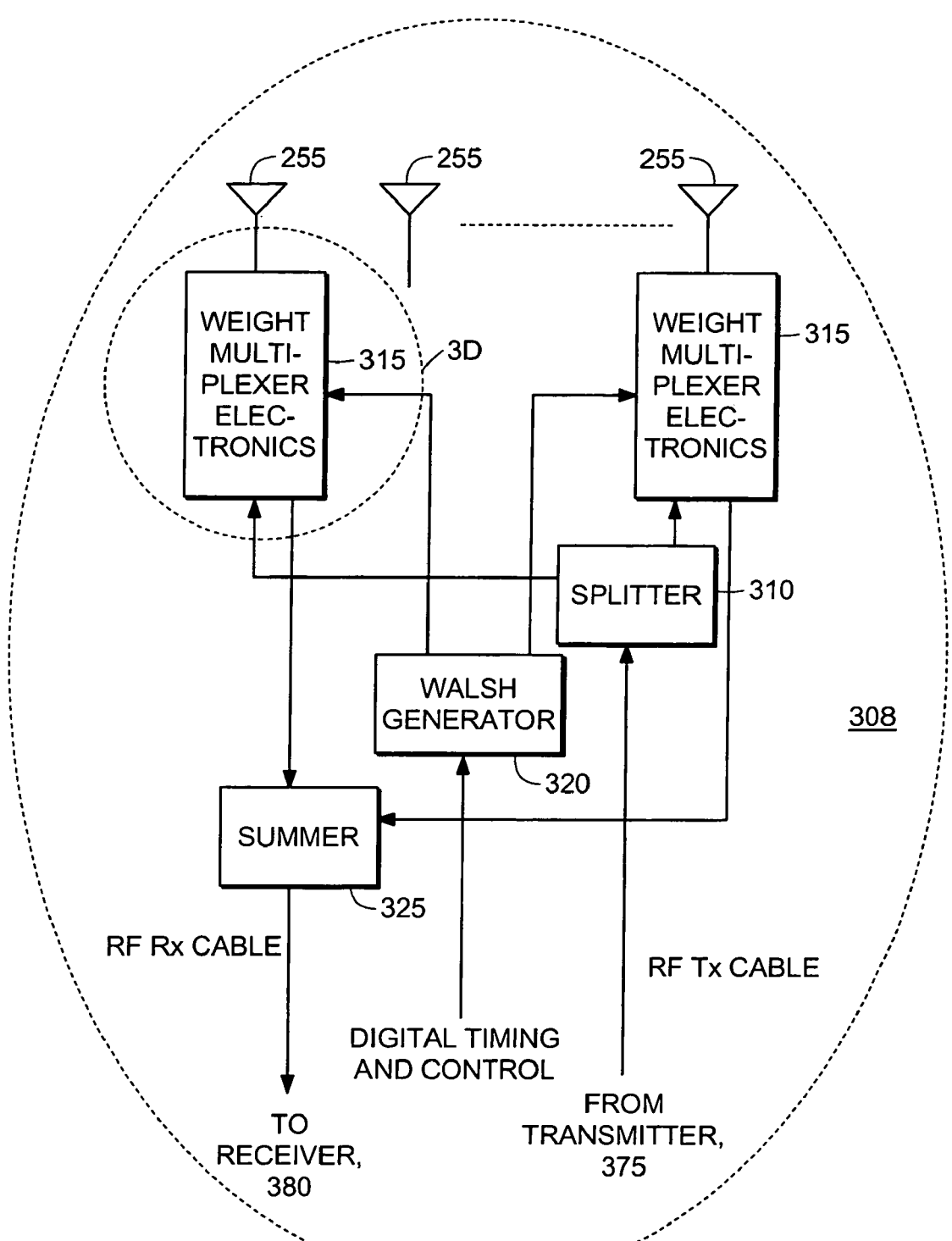
FIG. 3C is a schematic diagram of array electronics used in the base transceiver station of FIG 3A.

The array electronics 308 are located proximal to the sector antenna array 305. As shown in FIG. 3C, inside the array electronics 308 is a splitter 310, which receives RF signals via the RF Tx cable (not shown) in the RF cable 265a from the transmitter 375. The splitter 310 splits the received signal to among plural weight multiplexer electronics (Mux Elx) 315. The weight multiplexer electronics 315 are each coupled to respective elements 255 in respective sector antenna arrays 305.

The weight multiplexer electronics 315 also receive signals from a code generator, in this case a Walsh code generator 320. The Walsh code generator 320 receives digital and timing control from the base electronics 306. In the receiving path, the weight multiplexer electronics 315 provide RF signals to a summer 325. The summer 325 transmits a composite RF Rx signal to the receiver 380 via an RF Rx cable (not shown) in the RF cable 265a.

Figure 3D:
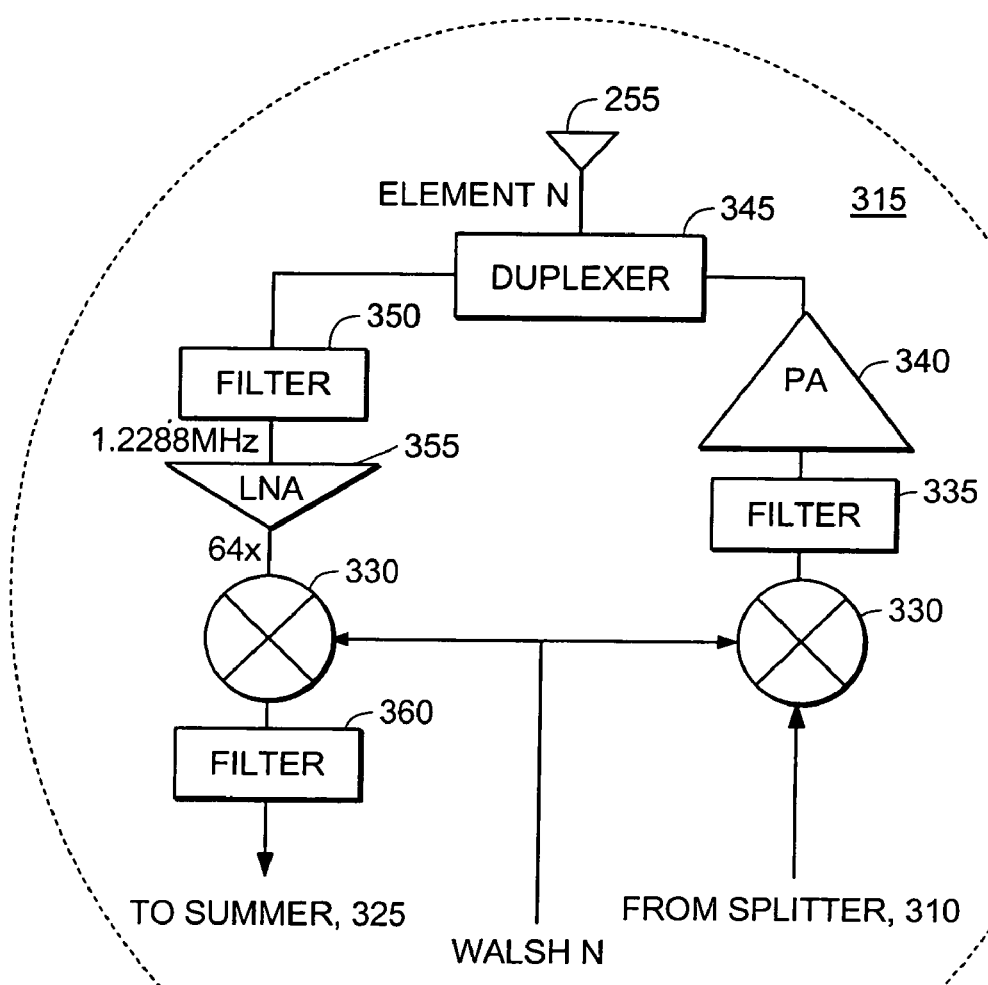
FIG. 3D is a schematic diagram of weight multiplexer electronics used in the array electronics of FIG. 3C.

As shown in FIG. 3D, inside the weight multiplexer electronics 315, there are circuits for transmitting an RF signal and receiving an RF signal. In the transmitting path, the RF signal is received from the splitter 310 by a modulator 330. The RF signal is modulated with a Walsh code from the Walsh code generator 320 to extract the correct signal(s) and beam weighting(s) (i.e., intended for the associated antenna element) from the composite RF Tx modulation signal, as described in more detail in reference to FIGS. 6A and 7. The extracted signal is then filtered by a filter 335, such as a bandpass filter, and amplified by a power amplifier 340. The amplified signal is output from the transmitter power amplifier 340 to the respective antenna element 255 via a duplexer 345, which alternates between transmit and receive in a typical manner.

Continuing to refer to the weight multiplexer electronics 315, in the receiving path, the antenna element 255 receives an RF Code Division Multiple Access (CDMA) signal from a mobile station (not shown). The received signal travels from the element 255 to the duplexer 345. In turn, the duplexer 345 passes the received signal to a first filter 350, such as a bandpass filter. Following the filter 350, a low noise amplifier (LNA) 355 amplifies the received signal. The amplified received signal is then modulated by a modulator 330 with a Walsh code from the Walsh generator 320. The coded RF signal is then filtered by a second filter 360, such as a bandpass filter, and summed with other coded, received, RF signals—from other weight multiplexer electronics 315—by a summer 325 to form a composite, coded, RF signal. The summer 325 then transmits the composite Rx signal from all elements 255 to the receiver 380 in the transceiver 370.

It should be understood that forming the composite coded signal can be done in other ways, such as placing summing units between the low-noise amplifier 355 and modulator 330, without departing from the principles of the present invention.

In operation, the base electronics 306 and array electronics 308 are processing symbols. A symbol is graphically illustrated in FIG. 4A.

Figure 4A:
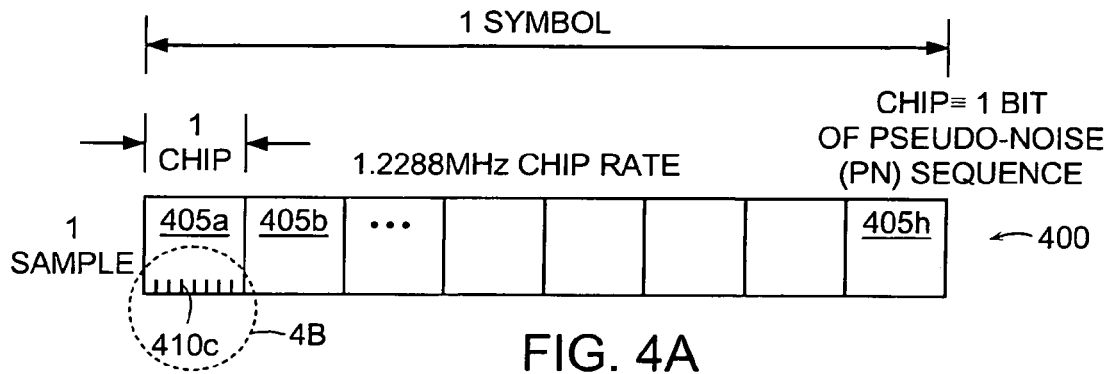
FIG. 4A is a block diagram of a symbol operated on by the base transceiver station system of FIG. 3A.
Figure 4B:
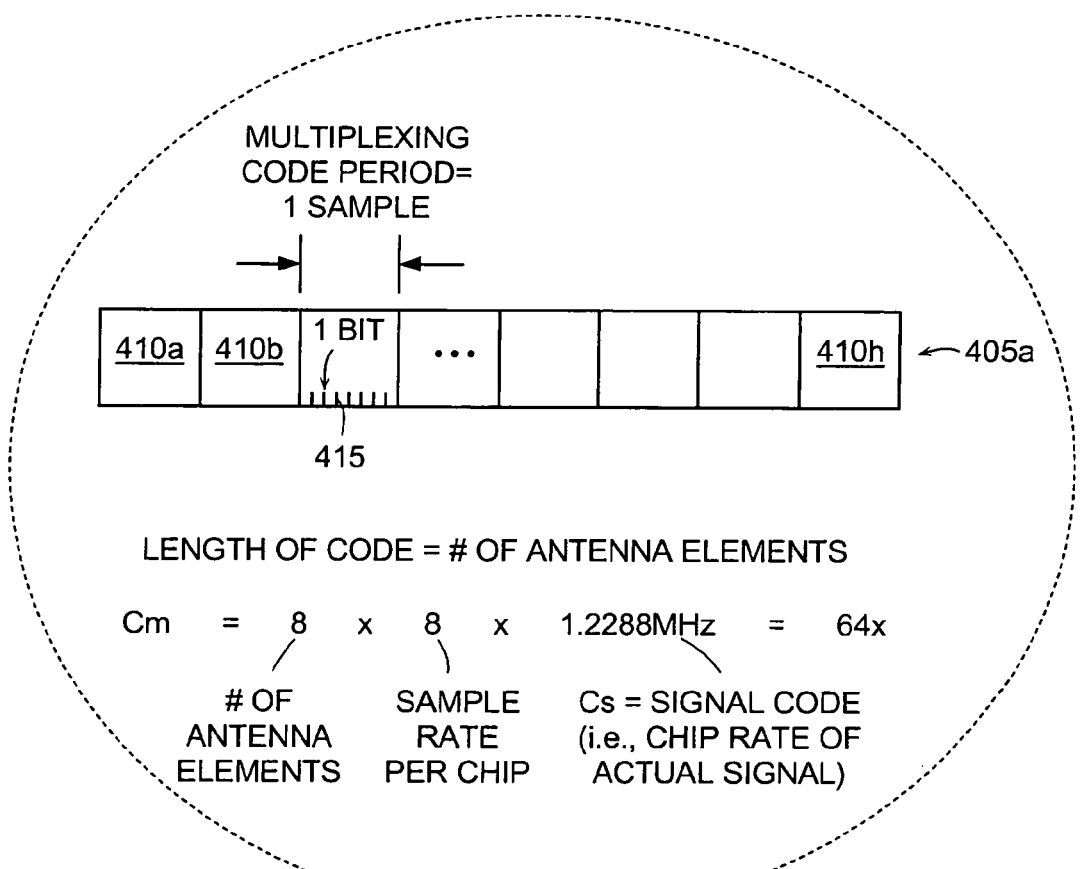
FIG. 4B is a block diagram of a chip composing a part of the symbol of FIG. 4A.

FIG. 4A is a block diagram of a symbol 400 having eight chips 405a, 405b, ..., 405h (collectively 405). The chips occur at a given chip rate. For example, the given chip rate may be 1.2288 MHZ.

A chip 405a is one bit of a pseudo-noise (PN) sequence. Each chip, such as chip 405a, is sampled a given number of times, such as eight times. The length of each sample corresponds to a multiplexing code period. To achieve the beam forming, the samples are further divided into bits 415. Each bit 415 corresponds to a portion of a code applied to (i.e., dedicated to) a respective antenna element 255; therefore, the length of the code is typically equal to the number of antenna elements. So, for example, for eight antenna elements and a sample rate of eight samples per chip, it is said that the code is 64x. For a signal code rate of 1.2288 MHZ, the multiplexing code, Cm, is 64×1.2288. The multiplexing code, Cm, is discussed elsewhere herein as Walsh codes, Wi, or more generically as orthogonal codes. The codes may also be non-orthogonal codes.

Referring again to FIG. 3D, using the example provided in FIG. 4A, following the LNA 355, the chip rate is seen as 1.2288 MHZ. After modulating the chip rate with the Walsh code, the code rate is said to be 64x. Similar processing takes place in the transmitting path.

Figure 5A:
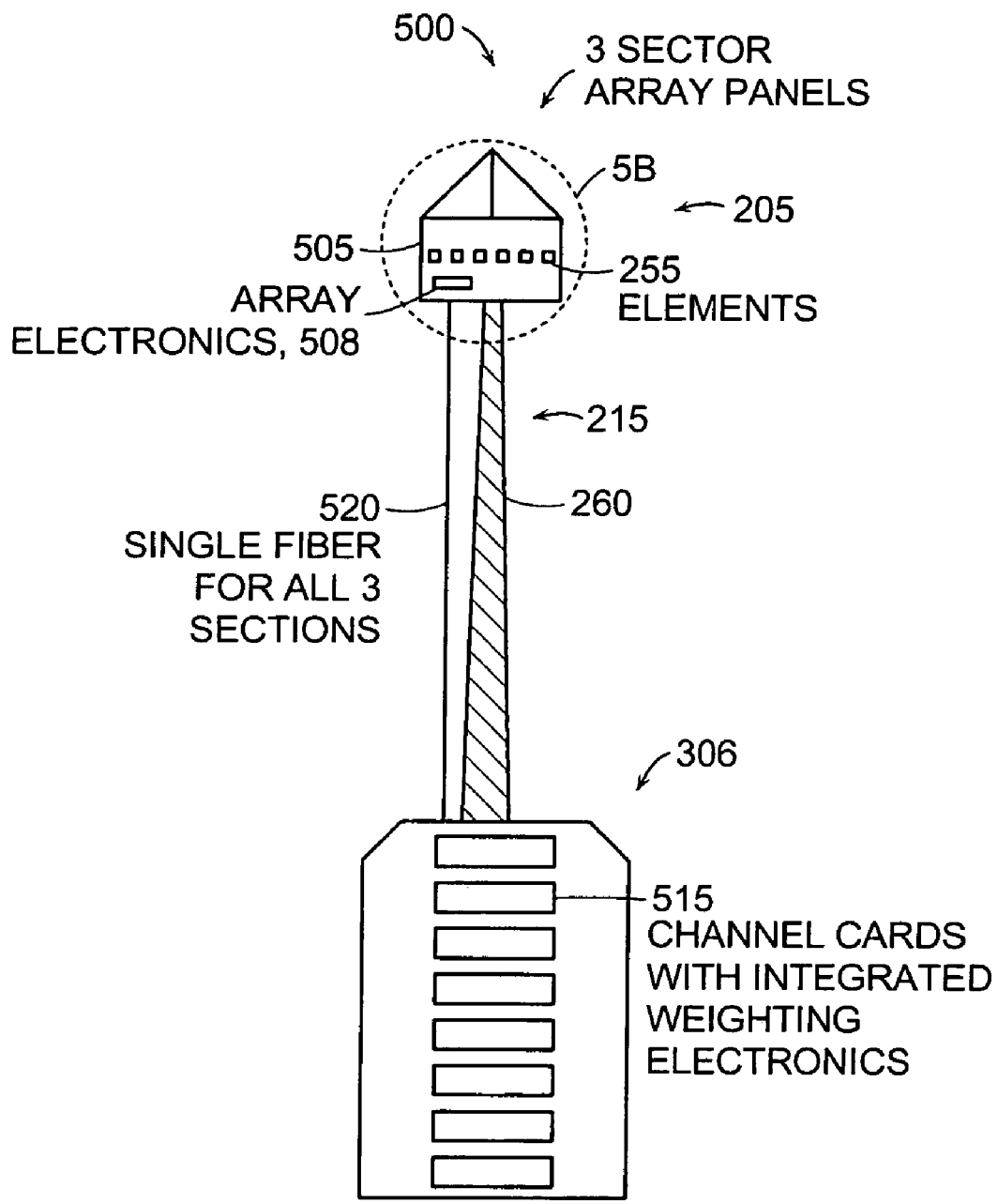
FIG. 5A is a schematic diagram of an integrated electronics approach embodiment of the base transceiver station of FIG. 3A.

FIG. 5A is an alternative embodiment of the base station 300 employing the principles of the present invention. In the base station 500 of FIG. 5A, the base electronics 306 include channel cards 515 with integrated weighting electronics. In this embodiment, the channel cards 515 transmit signals to be transmitted by the elements 255 of sector antenna array(s) 505 to mobile station(s) via a single fiber 520 for all three sector antenna arrays 505.

Figure 5B:
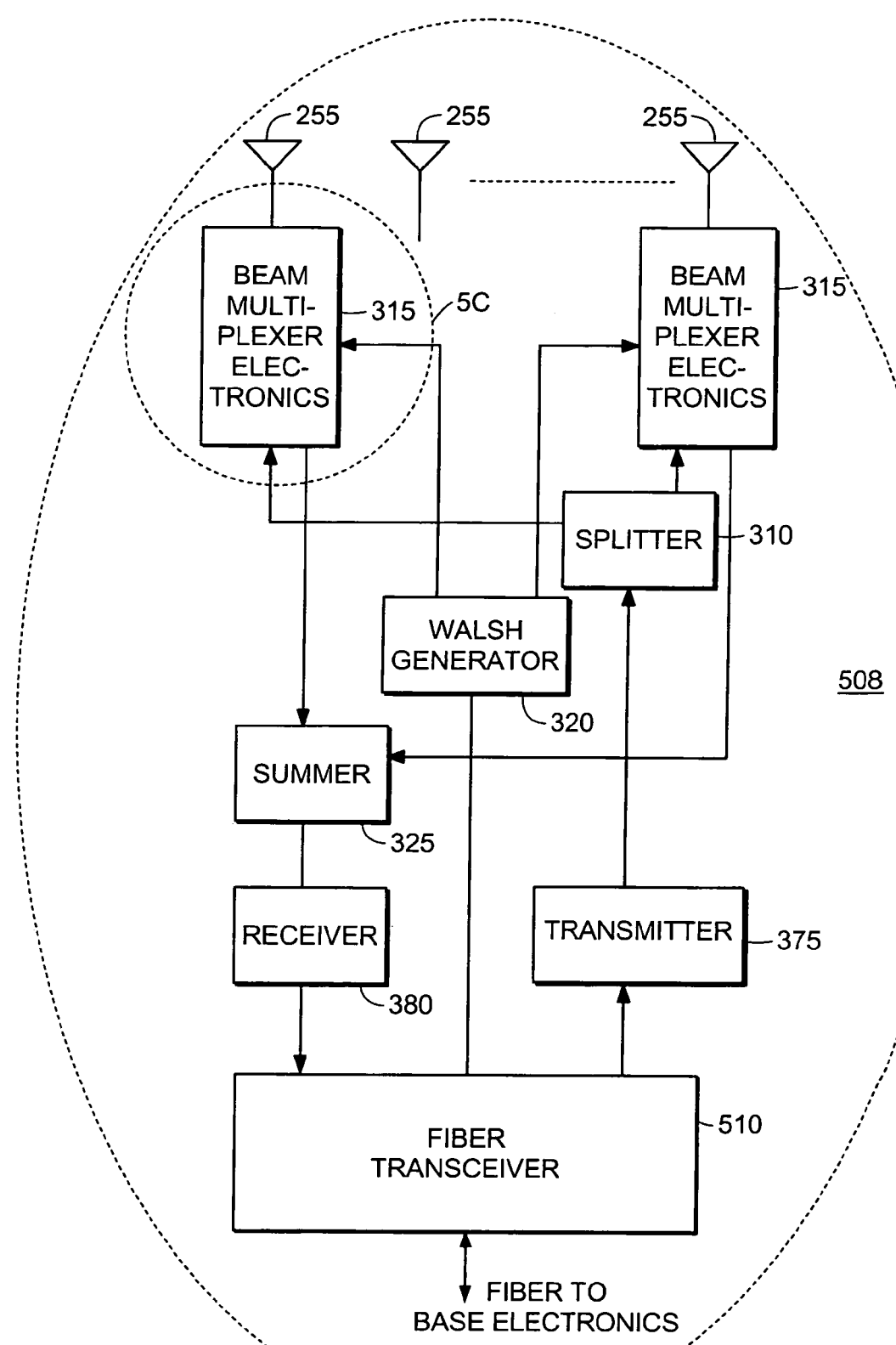
FIG. 5B is a schematic diagram of array electronics used in the base transceiver station of FIG. 5A.
Figure 5C:
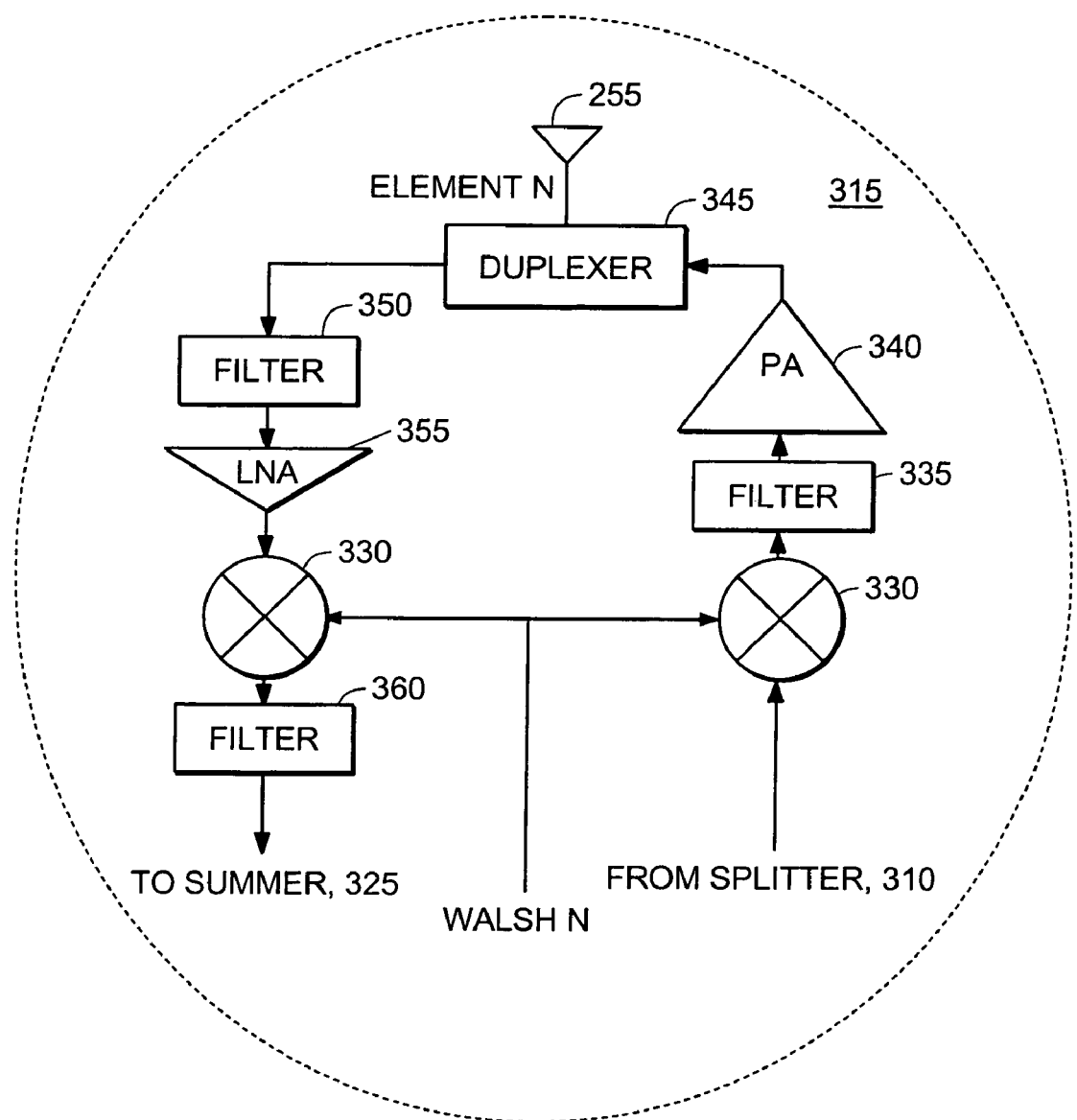
FIG. 5C is a schematic diagram of beam multiplexer electronics used in the array electronics of FIG. 5B.

In the sector antenna arrays 505, as shown in detail in FIGS. 5B and 5C, array electronics 508 include a fiber transceiver 510 to transceive (i.e., transmit and/or receive) signals to and from the channel cards 515 in the base electronics 306. The fiber transceiver 510 (i) passes received signals, optionally with some processing having been performed on the received signals, from the base electronics 306 to the transmitter 375 and (ii) transmits signals received from the receiver 380 to the base electronics 306.

By using a single fiber 520 for passing data between the base electronics 306 and the array electronics 508, the weight of cabling is reduced from using RF cables to using the single fiber 520 for all three sectors. It should be understood that additional fibers to carry signals may be employed without departing from the principles of the present invention.

Fiber optic communications have an advantage over RF communications in at least two ways: first, fiber optic communication components tend to be less sensitive to environmental conditions, such as temperature and humidity, and second, fiber optic communications keep EMI noise to a minimum, which is more difficult to control in the RF cable 265a (FIG. 3A).

Figure 6A:
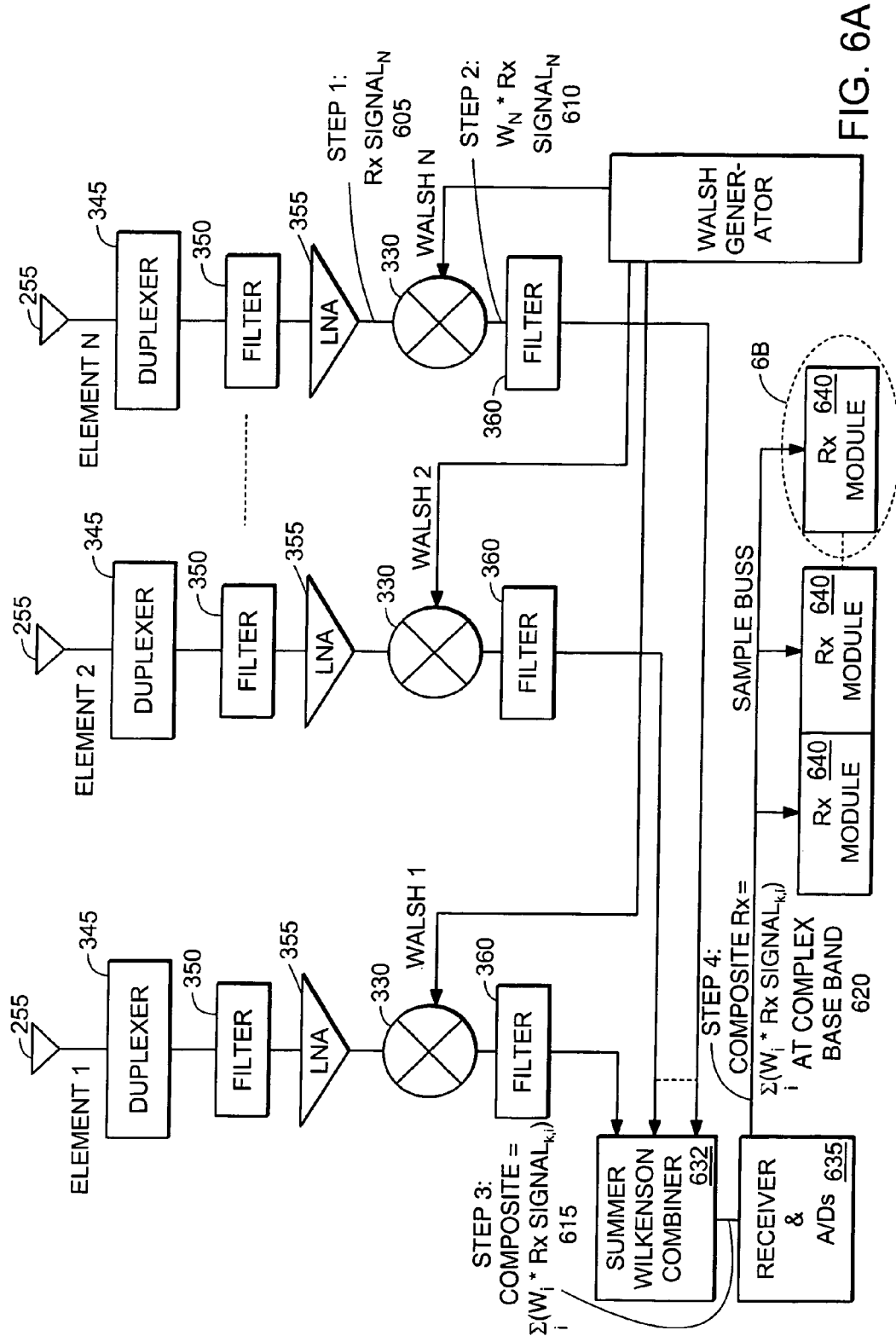
FIG. 6A is a flow diagram of an embodiment of a receiving process in the base transceiver stations of FIGS. 3A and 5A.

FIG. 6A is a block diagram annotated with receiving processing flow. In the first step 605 the signal $RxSignal_N$ (i.e., received RF signal) from a mobile station (not shown) is received by the N'th element of the antenna array. It should be understood that a similar RF signal is received by each of the elements 255 of the respective sector antenna array.

Following the first step 605, the received RF signal is modulated with a Walsh code, Walsh N, by the modulator 330. Following the filter 360, the second step 610 is completed, at which point the signal received by the N'th element of the antenna array is equal to $W_N*RxSignal_N$.

Following the Summer Wilkenson combiner 632, a third step 615 is completed. This third step results in a composite-received signal, which is represented by the following equation:

$$CompositeRx = \Sigma_i(W_i*RxSignal_{k,i}) \text{ at RF frequencies,}$$

where i indexes the elements and k indexes the individual information signals.

In the receiver and A/D conversion, a fourth step is completed in which the composite-received signal at RF is converted into a baseband digital representation. The baseband digital representation of the composite received signal is represented by the following equation:

$$CompositeRx = \Sigma_i(W_i*RxSignal_{k,i}) \text{ at complex baseband.}$$

Alternatively, the composite-received signal at RF is converted into an intermediate-frequency (IF) representation and processed thereafter accordingly.

In the complex baseband embodiment, the complex, baseband, composite, received signal is then processed by individual receiver modules 640.

Figure 6B:
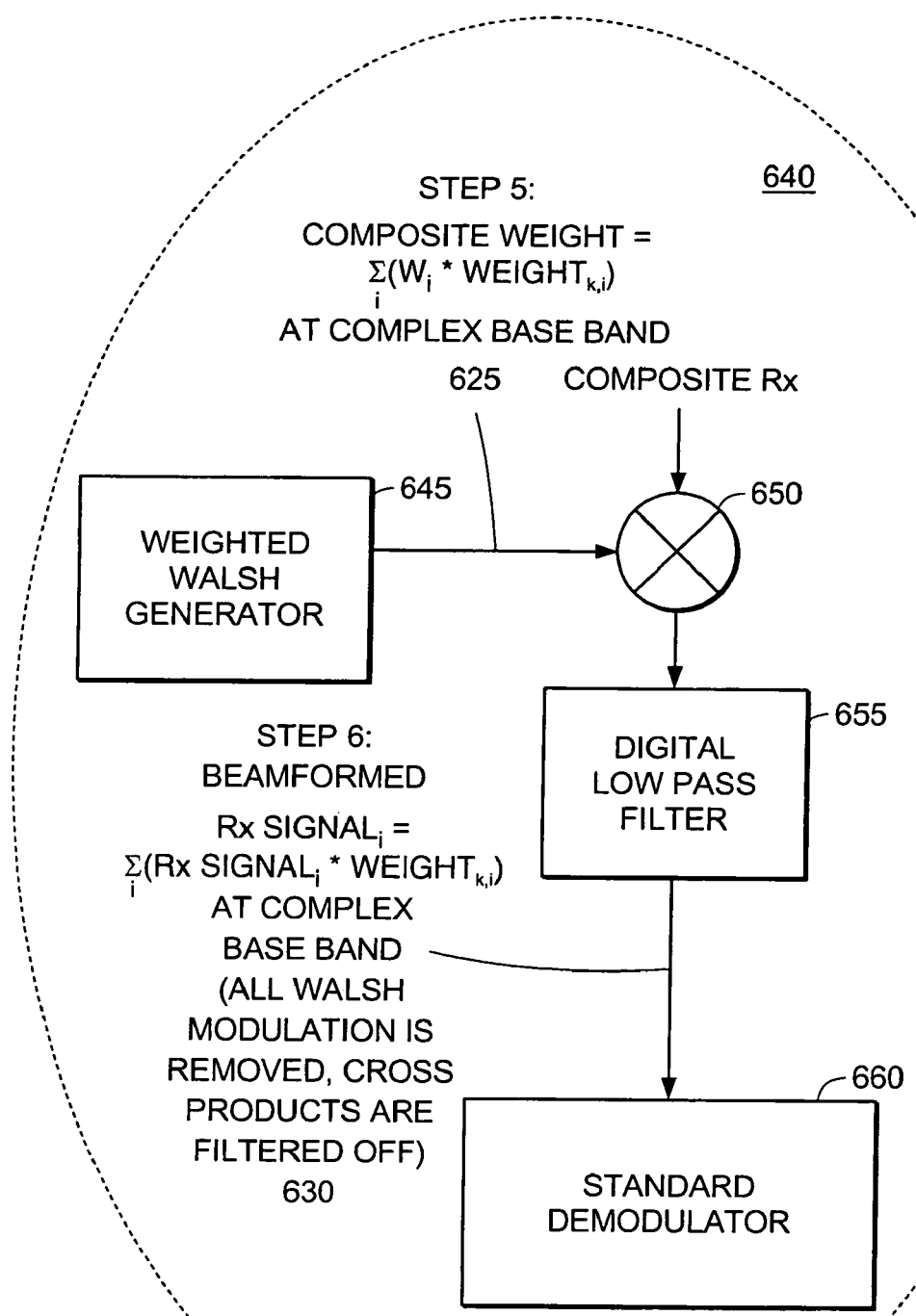
FIG. 6B is a block diagram of a receiver module used in the receiving process of FIG. 6A.

Referring now to FIG. 6B, in the individual receiver modules, a fifth step 625 is performed in which a weighted Walsh generator produces a composite weight signal at complex baseband, where the composite weight signal is represented by the following equation:

$$CompositeWeight = \Sigma_i(W_i*Weight_{k,i}) \text{ at complex baseband.}$$

In the weighted Walsh code generator 645, a modulator (not shown) modulates the Walsh codes with the weights.

The Walsh code generator 645 (i) produces the same Walsh codes as the Walsh codes used to code the received RF signals and (ii) is synchronized with the Walsh code generator generating the Walsh codes with which the received RF signal(s) is/are modulated. The weights correspond with the elements of the respective sector antenna array receiving the signals from the mobile station to produce a predetermined spatial beam forming effect (i.e., beam pattern) to reconstruct the signal in a beam forming manner.

The composite weight signal of step five 625 and composite received signal at baseband of the fourth step 620 are (i) modulated together by a modulator 650 in the individual receiver modules 640 then (ii) low-pass filtered by a digital low-pass filter 655, which produces the results of step six 630.

The results of step six include a beam formed received signal, which is represented by the following equation at complex baseband:

$$\text{BeamFormedRxSignal}(k) = \Sigma(\Sigma_i W_i^* \text{Weight}_{k,i}^* \Sigma_i W_i \text{RxSignal}_{k,i}),$$

where the external summation is performed over the duration of the multiplexing code. The equation can be reduced to the following equation:

$$\text{BeamFormedRxSignal}_i = \Sigma_i(\text{RxSignal}_i^* \text{Weight}_{k,i}) \quad \text{at complex baseband}.$$

In this last equation, all Walsh modulation is removed and cross products have multiplied to near zero by the modulator 650 (see the discussion below in reference to FIG. 7) and any remaining noise has been filtered off by the digital low pass filter 655. In other words, the final equation represents the beam formed received signal.

Figure 7:
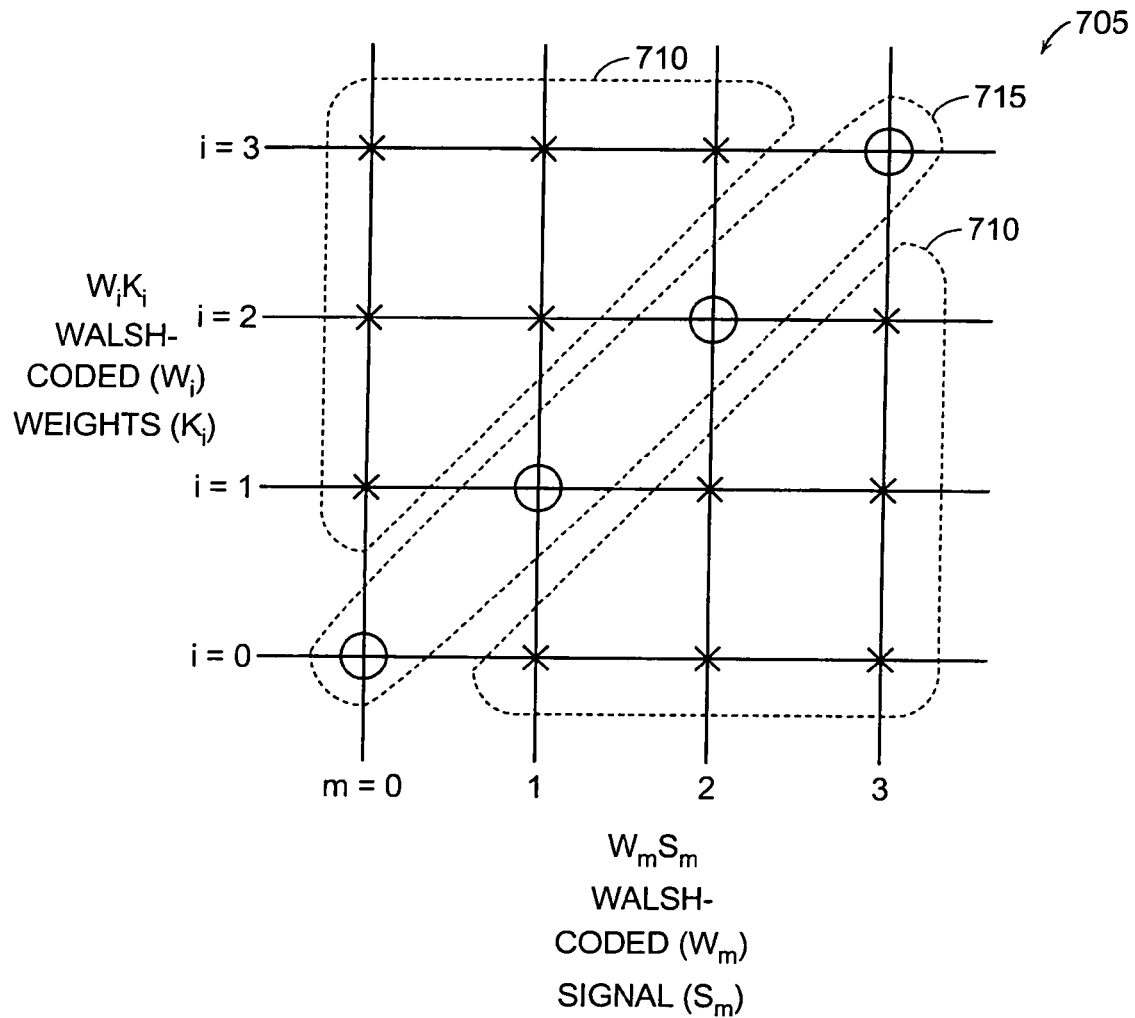
FIG. 7 is an abstract diagram of coding mathematics used in the receiving process of FIG. 6A.

FIG. 7 is a graphical representation of the mathematics embedded in the receiving and transmitting processes occurring through the use of employing the Walsh codes. Walsh codes are orthogonal codes and are represented by the grid 705, where the variable i is used to index the rows and the variable m is used to index the columns. The rows of the grid 705 are represented by the Walsh coded weights $W_i \text{Weight}_{k,i}$. The columns of the grid 705 are representative of the Walsh coded signal $W_i \text{RxSignal}_{i,m}$. Because of the orthogonal quality of the Walsh codes, multiplying Walsh codes that are not the same go toward zero. Therefore, off-diagonal code match-ups 710 are "zeroed out," as represented by the X's at off-diagonal row and column intersections. Codes that match up along the diagonal 715 are equal to or approximate unity. Thus, the weights and received signals associated with the codes that line up along the diagonal 715 are both multiplied together and multiplied by unity, whereas weights and received signals that are associated with off-diagonal code match-ups 710 are multiplied together and by zero, thus illustrating the results of step six 630 (FIG. 6A).

Figure 8A:
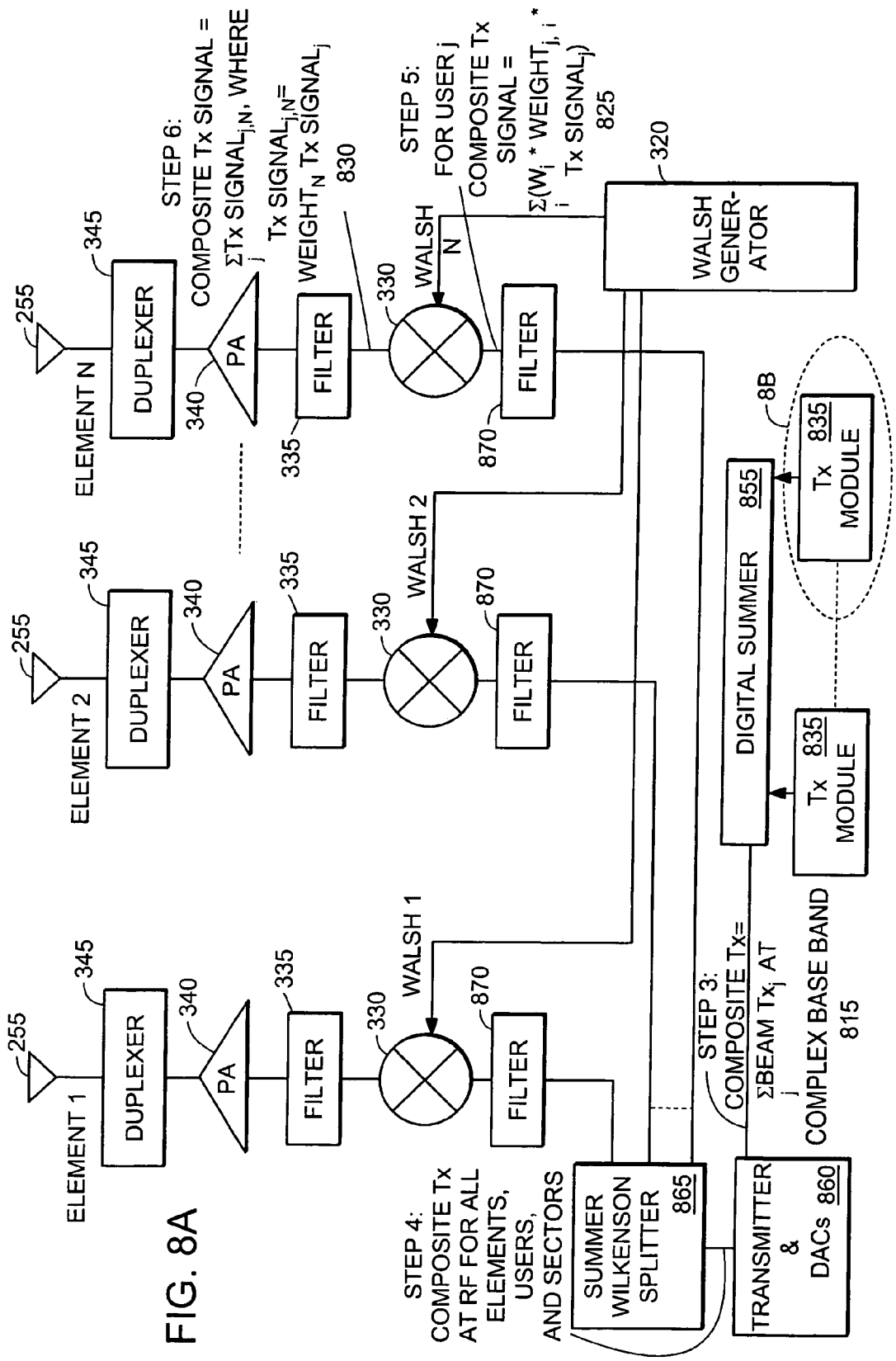
FIG. 8A is a flow diagram of an embodiment of a transmitting process in the base transceiver stations of FIGS. 3A and 5A.
Figure 8B:
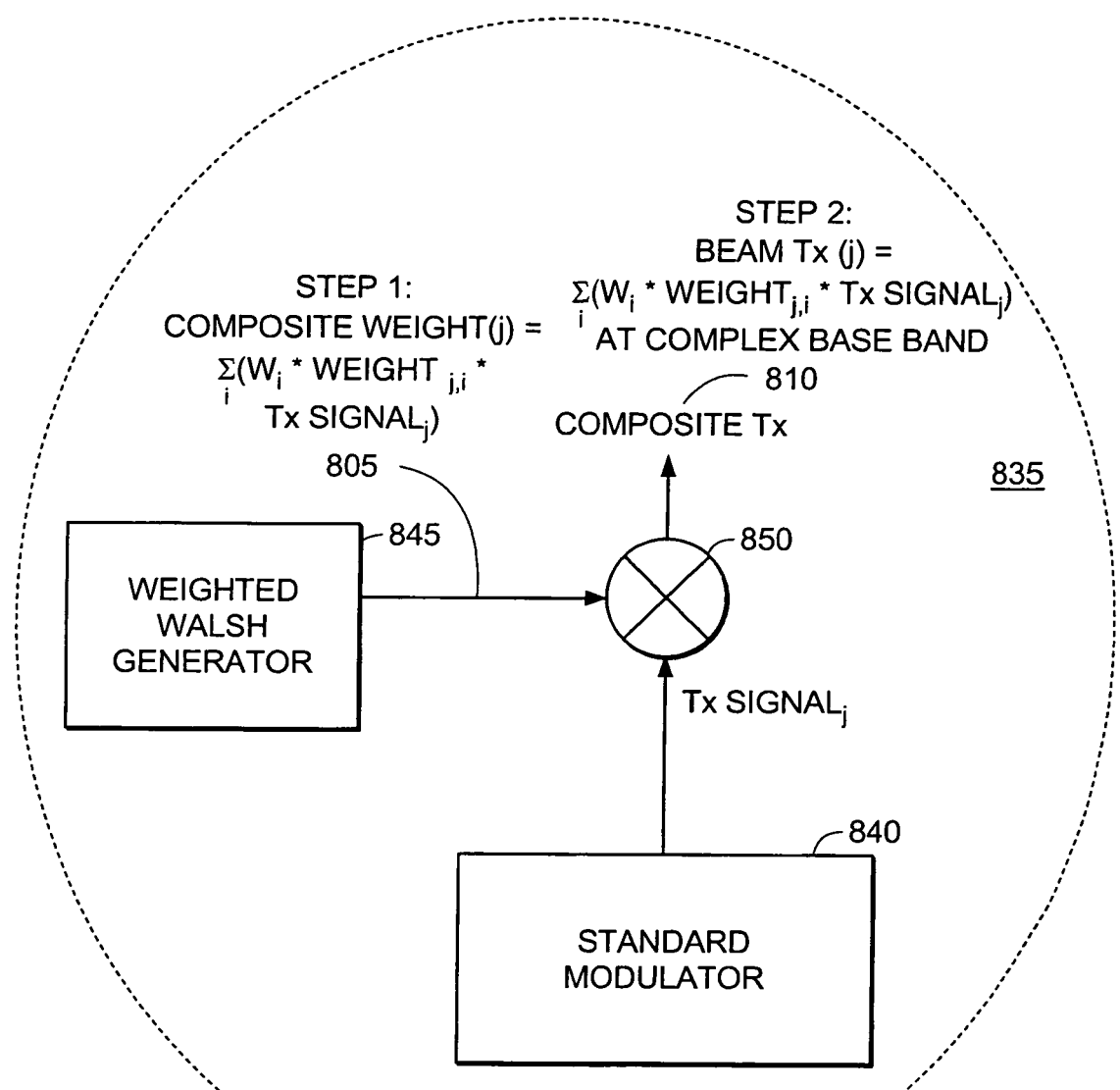
FIG. 8B is a schematic diagram of a transmitter module used in the transmitting process of FIG. 8A.

FIG. 8A is a schematic diagram of the transmitting processing flow. Inside each of plural transmitter modules 835, as shown in detail in FIG. 8B, a standard modulator 840 modulates a data signal to be transmitted. The modulated data signal is modulated with a weighted Walsh code generated by a weighted Walsh code generator 845. The results of the first step 805 is produced by the weighted Walsh code generator 845, where the weighted Walsh codes are represented by the following equation:

$$\text{CompositeWeight}(j) = \Sigma_i(W_i^* \text{Weight}_{j,i}) \quad \text{at complex baseband,}$$

where j indexes the unique information signals and beams and i indexes the antenna elements 255.

The composite weight signal and the modulated data signal are modulated together by a modulator 850 that produces the result of the second step 810, which is the beam to be transmitted. The beam to be transmitted in the second step 810 is represented by the following equation:

$$\text{BeamTx}(j) = \Sigma_i(W_i^* \text{Weight}_{j,i}^* \text{TxSignal}_j) \quad \text{at complex baseband}.$$

Referring again to FIG. 8A, each transmitting module 835 provides a digital representation of the transmission beam signal at complex baseband to a digital summer 855. The output from the digital summer 855 produces the result of the third step 815, which is the composite transmission signal represented by the following equation:

$$\text{CompositeTx} = \Sigma_j \text{BeamTx}_j \quad \text{at complex baseband}.$$

This is the composite transmission signal to be transmitted by the antenna array to the users of the mobile stations (not shown) communicating with the base station system.

A transmitter and D/A converter 860 provides the results for the fourth step 820, which is a composite transmission signal at RF for all elements 255, users, and sectors. Thus, the fourth step 820 includes all information for all beams being produced by the beam forming system. A Summer Wilkenson splitter 865 splits the composite transmission signal at RF for all elements 255, users, and sectors.

Following the splitter 865, filters 870, such as bandpass filters, filter the composite signals to produce the results for the fifth step 825. The fifth step 825 includes a respective weight and signal for a given element in the antenna array. Thus, the following equation is provided in the fifth step 825:

$$\text{for user } j, \Sigma_i(W_i^* \text{Weight}_{j,i}^* \text{TxSignal}_j).$$

The result of the fifth step 825 is modulated with codes from the Walsh code generator 320 by the modulator 330. The Walsh code generator 320 is synchronized with and provides the same Walsh codes as the Walsh code generator employed by the weighted Walsh code generator 845 in each of the transmitter modules 835.

The output from the modulators 330 is the composite transmission signal of the sixth step 830 to be radiated by the respective antenna element 255. For the N'th element, the composite transmission signal, $\text{CompositeTxSignal}(N) = \Sigma_j \text{TxSignal}_{j,N}$, where $\text{TxSignal}_{j,N} = \text{Weight}_N^* \text{TxSignal}_j$. In other words, by modulating the coded composite signal to be transmitted by the coded N'th Walsh code, only the weighted transmission signal to be transmitted by the N'th element of the antenna array remains, as described in reference to FIG. 7.

A base station employing the principles of the present invention just described allows a significantly lower interference level between users in a multi-user, multi-path environment. Further, the base station allows a higher number of users or users at a higher data rate to occupy the same cell and spectrum while at the same time reducing (i) the cost of a sectored cellular system, and (ii) the cost of a beam forming system. Adding the subscriber antenna array allows a "virtual point-to-point RF connection" with very high data rate/SNR and liability. When combined with a "non-orthogonal BTS code overlay", additional users may be served.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for receiving signals in a radio communication system, comprising:
    forming a first code division multiplexed signal composed of codes multiplied by RF signals detected by elements of an antenna array used for beam forming;
    forming a second code division multiplexed signal composed of coded weights associated with the elements of the antenna array; and
    decomposing the code division multiplexed signal in a beam-forming manner by modulating said first code division multiplexed signal with said second code division multiplexed signal to produce a weighted baseband signal to produce a spatial beam forming effect.

2. The method as claimed in claim 1, further including:
    forming plural first code division multiplexed signals;
    forming plural second code division multiplexed signals; and
    modulating baseband representations of the plural first code division multiplexed signals with the plural second code division multiplexed signals to produce plural weighted baseband signals composing the beam forming.

3. The method as claimed in claim 2, further including integrating the weighted baseband signals over the duration of the codes to determine the content of the RF signals.

4. The method as claimed in claim 1, wherein forming the first code division multiplexed signal is performed proximal to the antenna array and further including transmitting the first code division multiplexed signal across a transmission path to a receiver located distal from the antenna array.

5. The method as claimed in claim 4, wherein forming the second code division multiplexed signal is performed proximal to the antenna array and further including transmitting the second code division multiplexed signal across the transmission path to the receiver located distal from the antenna array.

6. The method as claimed in claim 4, wherein forming the second code division multiplexed signal is performed distal from the antenna array.

7. The method as claimed in claim 1, wherein forming the code division multiplexed signals includes coding (i) the RF signals from each element and (ii) weights intended for each element with the same codes in a one-to-one paired manner.

8. The method as claimed in claim 1, wherein a representation of said first code division multiplexed signal is generated in part by sampling a representation of the coded RF signal, the timing between the sampling the RF signal and modulating the RF signal with the codes being locked to avoid sampling modulation-related transitions.

9. The method as claimed in claim 1, wherein the codes are orthogonal codes.

10. The method as claimed in claim 9, wherein the orthogonal codes are Walsh codes.

11. The method as claimed in claim 1, deployed in a base station.

12. A method for transmitting a signal in a radio communication system, comprising:
    forming a first code division multiplexed signal composed of coded weights associated with respective elements of an antenna array used for beam forming;
    modulating the first code division multiplexed signal with a modulated data signal to produce a second code division multiplexed signal including both the weights and data for the elements of the antenna array;
    up-converting the second signal to an RF representation of the second signal; and
    using the same codes as used to form the first code division multiplexed signal, decomposing the RF representation of the second signal to apply the weights to respective elements of the antenna array for transmitting the RF representation from the antenna array in a beam-forming manner.

13. The method as claimed in claim 12, wherein said forming, modulating, up-converting, and decomposing are performed proximal to the antenna array and further including receiving the modulated data signal via a transmission path from a transmitter located distal from the antenna array.

14. The method as claimed in claim 12, wherein said forming, modulating, and up-converting are performed distal from the antenna array and further including transmitting the RF representation of the second signal via a transmission path and wherein the decomposing is performed proximal to the antenna array.

15. The method as claimed in claim 12, further including:
    (i) forming plural code division multiplexed signals, including:
        (a) respective modulated data signals; and
        (b) respective coded weights having the same codes but different weights; and
    (ii) summing the plural code division multiplexed signals to produce a composite code division multiplexed signal.

16. The method as claimed in claim 15, wherein decomposing the RF representation applies the plural code division multiplexed signals to the elements of the antenna array to transmit plural signals from the antenna array in a beam-forming manner simultaneously.

17. The method as claimed in claim 12, wherein up-converting includes converting the second code division multiplexed signal from digital to analog in a manner that avoids converting during code transition times.

18. The method as claimed in claim 12, wherein transmitting includes amplifying the RF representation at individual elements.

19. The method as claimed in claim 12, wherein the codes are orthogonal codes.

20. The method as claimed in claim 19, wherein the orthogonal codes are Walsh codes.

21. The method as claimed in claim 12, deployed in a base station.

22. Apparatus for receiving signals in a radio communication system, comprising:
    a summing unit to form a first code division multiplexed signal composed of codes multiplied by RF signals detected by elements of an antenna array used for beam forming;
    a coded weight generator to form a second code division multiplexed signal composed of codes multiplied by weights associated with the elements of the antenna array; and
    a demodulator to decompose the code division multiplexed signal in a beam-forming manner by modulating said first code division multiplexed signal with said second code division multiplexed signal to produce a weighted baseband signal composing the beam forming.

23. The apparatus as claimed in claim 22, wherein:
    the summing unit forms the first code division multiplexed signals composed of codes multiplied by plural RE signals detected by the elements of the antenna array; and further including:
plural coded weight generators to generate plural second code division multiplexed signals; and
plural demodulators to modulate baseband representations of the plural first code division multiplexed signals with the plural second code division multiplexed signals to produce plural weighted baseband signals composing different beams in the beam forming.

24. The apparatus as claimed in claim 23, further including plural integration units to integrate the weighted baseband signals over the duration of the codes to determine the content of the RE signals.

25. The apparatus as claimed in claim 22, wherein the summing unit is located proximal to the antenna array and wherein the demodulator is located distal from the antenna array and in communication with the summing unit via a transmission path.

26. The apparatus as claimed in claim 25, wherein the coded weight generator is located proximal to the antenna array and in communication with the demodulator via the transmission path.

27. The apparatus as claimed in claim 25, wherein the coded weight generator is located distal from the antenna and in communication with the summing unit via the transmission path.

28. The apparatus as claimed in claim 22, wherein the codes used to code the RF signals and weights are the same codes.

29. The apparatus as claimed in claim 22, wherein the baseband representation of said first code division multiplexed signal is generated in part by a sampler sampling the coded RF signal, the timing between the sampler and the modulator modulating the RF signal with the codes being locked to avoid sampling modulation-related transitions.

30. The apparatus as claimed in claim 22, wherein the codes are orthogonal codes.

31. The apparatus as claimed in claim 30, wherein the orthogonal codes are Walsh codes.

32. The apparatus as claimed in claim 22, deployed in a base station.

33. Apparatus for transmitting a signal in a radio communication system, comprising:
a weighted code generator to form a first code division multiplexed signal composed of weighted codes associated with respective elements of an antenna array used for beam forming;
a modulator to modulate the first code division multiplexed signal with a modulated data signal to produce a second code division multiplexed signal including both the weights and data for the elements of the antenna array;
an up-converter to up-convert the second signal to an RE representation of the second signal; and
using the same codes as used to form the first code division multiplexed signal, plural demodulators associated with respective elements of the antenna array to modulate the RF representation with the codes to decompose the RF representation to apply the weights to respective elements of the antenna array for transmitting the RF representation from the antenna array in a beam-forming manner.

34. The apparatus as claimed in claim 33, wherein said weighted code generator, modulator, up-converter, and plural demodulators are located proximal to the antenna array and further including a transmitter located distal from the antenna array in communication with the weighted code generator modulator, up-converter, and plural demodulators via a transmission path.

35. The apparatus as claimed in claim 33, wherein said weighted code generator, modulator, and up-converter are located distal from the antenna array and in communication with the plural demodulators located proximal to the antenna array via a transmission path.

36. The apparatus as claimed in claim 33, further including:
(i) plural transmitter modules having respective weighted code generators and modulators to form plural code division multiplexed signals, including:
(a) respective modulated data signals;
(b) respective weighted codes having the same codes but different weights; and
(ii) a summing unit to sum the plural code division multiplexed signals to produce a composite code division multiplexed signal.

37. The apparatus as claimed in claim 36, wherein the demultiplexers decomposing the RF representation apply the plural code division multiplexed signals to the elements of the antenna array to transmit plural signals from the antenna array in a beam-forming manner simultaneously.

38. The apparatus as claimed in claim 33, wherein the up-converter converts the second code division multiplexed signal in a manner absent of converting during code transition times.

39. The apparatus as claimed in claim 33, further including transmitter power amplifiers to amplify the RF representation at individual elements.

40. The apparatus as claimed in claim 33, wherein the codes are orthogonal codes.

41. The apparatus as claimed in claim 40, wherein the orthogonal codes are Walsh codes.

42. The apparatus as claimed in claim 33, deployed in a base station.

43. Apparatus for receiving signals in a radio communication system, comprising:
means for forming a first code division multiplexed signal composed of codes multiplied by RF signals detected by elements of an antenna array used for beam forming;
means for forming a second code division multiplexed signal composed of coded weights associated with the elements of the antenna array; and
means for decomposing the code division multiplexed signal in a beam-forming manner by modulating said first code division multiplexed signal with said second code division multiplexed signal to produce a weighted baseband signal to produce a spatial beam forming effect.

44. Apparatus for transmitting a signal in a radio communication system, comprising:
means for forming a first code division multiplexed signal composed of coded weights associated with respective elements of an antenna array used for beam forming;
means for modulating the first code division multiplexed signal with a modulated data signal to produce a second code division multiplexed signal including both the weights and data for the elements of the antenna array;

means for up-converting the second signal to an RF representation of the second signal; and means for using the same codes as used to form the first code division multiplexed signal, decomposing the RF representation of the second signal to apply the weights to respective elements of the antenna array for transmitting the RF representation from the antenna array in a beam-forming manner.

* * * * *

UNITED STATES PATENT AND TRADEMARK OFFICE
CERTIFICATE OF CORRECTION

PATENT NO. : 7,002,902 B2 Page 1 of 1
DATED : February 21, 2006
INVENTOR(S) : James A. Proctor, Jr. et al.

It is certified that error appears in the above-identified patent and that said Letters Patent is hereby corrected as shown below:

Column 13,
Lines 1, 14 and 54, delete "RE" and insert -- RF --.

Signed and Sealed this

Thirtieth Day of May, 2006

JON W. DUDAS
*Director of the United States Patent and Trademark Office*